United States Patent [19]

Smith et al.

[11] Patent Number: 4,791,435

[45] Date of Patent: Dec. 13, 1988

[54] THERMAL INKJET PRINTHEAD TEMPERATURE CONTROL

[75] Inventors: James C. Smith; Hatem E. Mostafa; William J. Walsh, all of San Diego, Calif.

[73] Assignee: Hewlett-Packard Company, Palo Alto, Calif.

[21] Appl. No.: 77,552

[22] Filed: Jul. 23, 1987

[51] Int. Cl.[4] .......................................... G01D 15/24

[52] U.S. Cl. .......................... 346/140 R; 346/139 R; 400/54

[58] Field of Search .................... 346/140, 75, 76 PH, 346/139 R; 400/54

[56] References Cited

U.S. PATENT DOCUMENTS

| | | | |
|---|---|---|---|
| 4,496,824 | 1/1985 | Kawai | 346/76 PH X |
| 4,544,931 | 10/1985 | Watanabe | 346/140 |
| 4,590,488 | 5/1986 | Sullivan | 346/76 PH |
| 4,664,542 | 5/1987 | Tsugita | 400/124 |
| 4,668,965 | 5/1987 | Tanaka | 346/140 |
| 4,692,777 | 9/1987 | Hasumi | 346/140 |
| 4,704,620 | 11/1987 | Ichihashi | 346/140 |

FOREIGN PATENT DOCUMENTS

| | | |
|---|---|---|
| 58-187364 | 11/1983 | Japan . |
| 59-14969 | 1/1984 | Japan . |
| 2169856 | 7/1986 | United Kingdom . |

OTHER PUBLICATIONS

Ruddy, G. A.; Viscosity Control Circuit; IBM TDB, vol. 16, No. 10, Mar. 1974, pp. 3295.

*Primary Examiner*—Joseph W. Hartary

[57] ABSTRACT

Thermal inkjet printhead temperature control is provided in a temperature control system responsive to printhead temperature, which in the presence of printhead overheating selectively causes the printhead to stand idle, or, if multiple nozzles are available, shifts to a nozzle which, is not overheated, which in the event a nozzle is unused for some time and the dye transport agent may have evaporated leaving a viscous plug in the nozzle, employs warm up pulsing and/or nozzle spitting to clear the nozzles, and which when the temperatures of the nozzle is below acceptable printing temperatures, employs nozzle pulsing for warm up and/or nozzle spitting to clear the nozzles, all such decisions and actions being provided in advance of beginning a printing operation.

4 Claims, 4 Drawing Sheets

THERMAL INKJET PRINTHEAD TEMPERATURE CONTROL

TECHNICAL FIELD

This invention relations to thermal inkjet types of printers for producing printed text and/or graphics and more particularly to arrangements for controlling the uniformity of the ink drops in such printers by providing a control of the temperature of the printhead or pen.

BACKGROUND ART

The appearance of printed text or graphics produced by thermal inkjet print heads varies if the viscosity of the ink changes. Viscosity is affected by the printhead temperature which in turn varies with the use profile of the printhead and the temperature environment in which the printer operates.

One prior art approach taken in dealing with this problem has been to provide a spittoon into which ink drops are ejected prior to commencing printing. The purpose of this is twofold. First such ink drop ejection tends to clear viscous plugs from the nozzle of the thermal inkjet printhead and second, this preliminary use of the printhead provides a warm up interval, hopefully to achieve a printhead temperature at or near a desired temperature for printing purposes.

Another prior art effort in dealing with this problem has been to provide a multi-grade ink in which the change is viscosity over a limited range of printhead operating temperatures would not result in significant degradation of print quality.

DISCLOSURE OF THE INVENTION

While such prior art developments have provided improvements in the quality of printed text, further improvements in thermal inkjet printhead operation are achieved in accordance with this invention, in arrangements providing a control of thermal inkjet printhead temperature. Normal nozzle substrate temperatures for satisfactory printhead operation are about 40° C. Variations of about ±5° C. can be tolerated. Many things influence the temperature of the nozzle, these include: the ambient temperature of the environment, the amount of use a particular nozzle gets, the location of a nozzle on the nozzle substrate, i.e., near an edge or toward the center of the nozzle substrate.

In addition, certain dyes (and dye transport agents) are more sensitive to temperature than others. The magenta nozzles may be more sensitive to low temperatures than the black nozzles, for instance.

Therefore, the determination of temperature at or near each individual nozzle in a nozzle substrate is necessary to optimize printhead performance and hence to maximize print quality.

The printhead temperature is determined by several means. One is by placing temperature sensing transducers on the substrate for each nozzle. Alternatively a thermistor is placed on the printed circuit board to which the printhead is attached. This assembly is mounted on the printer carriage. Using the output of the thermistor a close estimate of the printhead temperature is achieved. Thermal models of the pens or printheads are provided and these are used in conjunction with printhead temperature sensors to provide the information useful in controlling the printhead temperature. Profiles of the use of each nozzle are developed. These profiles when compared with a thermal model provide information useful in controlling head temperature.

Temperature compensation and control is provided for both low printhead temperature and high printhead temperature.

At low temperatures low energy pulses are sent to a nozzle to heat it. These pulses are below the threshold which would cause a drop of ink to be fired. The number of pulses used in this warm up process is based on the nozzle's temperature, the location of the nozzle in the substrate, the dye (color) in the nozzle, and the use profile of the nozzle.

Another warming method which is employed is to fire some drops of ink from the nozzle into a spittoon which is located near the writing area but in a position outside of the writing area. The number of drops fired into this spittoon are based upon the temperature which is sensed, the nozzle location on the substrate, the color of the ink in the nozzle and the use profile of the nozzle.

At high temperature, the use profile and the temperature sensors are monitored to see if a particular nozzle exceeds its operable range. If this is the case, printing is stopped until the temperature drops or in the alternative where more than one nozzle is on the substrate another nozzle is used.

If a nozzle is unused for some time, the dye transport agent can evaporate, leaving a viscous plug in the nozzle. This evaporation is both temperature and time dependent. The nozzle use and temperature profiles are used in this situation to indicate when a nozzle needs to be cleared by firing ink drops into the spittoon. Low energy pulses which are below the level needed to fire ink drops are also used to warm and thin the viscous plugs depending upon the temperature and nozzle use profiles. Pulsing may be used independently of spitting or may be used prior to spitting to facilitate clearing the nozzles.

BRIEF DESCRIPTION OF THE DRAWINGS

The invention will be further understood by reference to the following specification when considered in conjunction with the accompanying drawings, in which.

BEST MODES FOR CARRYING OUT THE INVENTION

Figure 1:
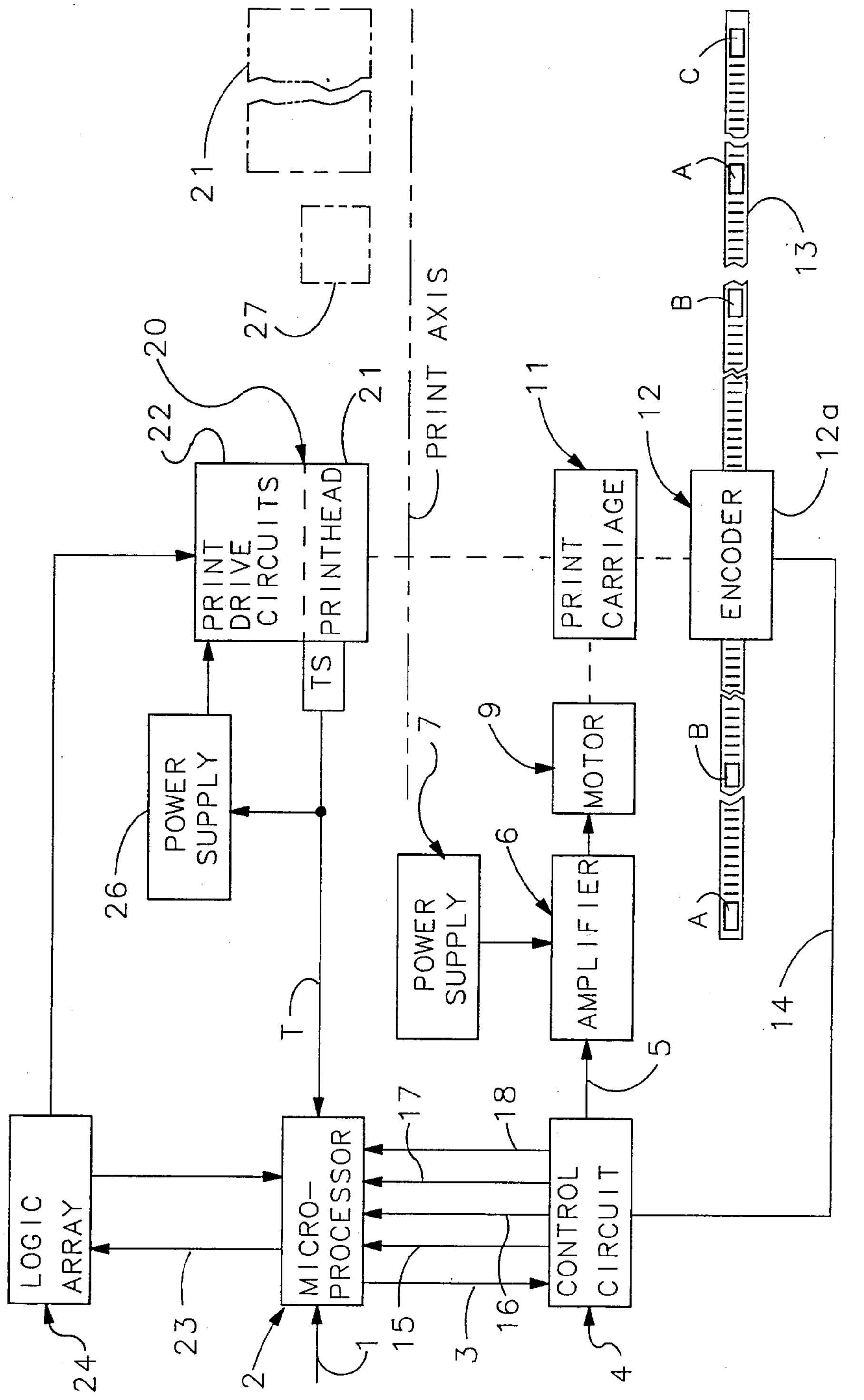
FIG. 1 is a block diagram of an improved thermal inkjet printer control system, including provisions for controlling the temperature of the printhead, in accordance with the principles of this invention.

FIG. 1 is a block diagram of a thermal inkjet printhead temperature control system embodying the principles of this invention. Print data may be supplied from an instrumentality such as a computer (not shown). Such print data is applied as input via a bus 1 to a microprocessor 2. In response to this input, as well as other inputs, yet to be described, the microprocessor produces control signals which are coupled by a bus 3 to a control circuit 4 which has multiple functions. The control circuit 4 produces a pulse width modulated signal which is coupled by a circuit 5 to a pulse width modulation amplifier 6 supplied with power from a power source 7. The amplifier 6 transforms and amplifies the input signal thereto to produce a drive voltage coupled by a circuit 8 to a motor 9. The motor 9 in this application is a DC motor functioning as a print carriage drive motor. The motor 9 drives a mechanism 10, such as a pulley and belt system, connected to a print carriage 11, to move the carriage in its axis. An encoder 12, comprising an encoder body 12*a* and an encoder scale 13 responds to carriage motion. The encoder scale 13 is secured at its ends to the printer chassis (not shown) in a position spanning and paralleling the carriage axis. The encoder body 12*a* which is mounted on the printer carriage, includes an optical scale detector therewithin which scans the tape as the carriage moves in its axis. Scale count signals, as well as signals indicative of start-of-print or end-of-print, from print limit bands B, carriage sweep limit signals from sweep limit bands A, etc., which are produced by the encoder, are coupled as feedback via circuit 14 to the control circuit 4. Control circuit 4, using the encoder signals, produces ink drop firing rate signals, coupled via a circuit 15 to the microprocessor for controlling ink drop firing, produces scale count signals coupled to the microprocessor via a bus 16 for motor control, produces print limit signals from print bands B of the scale, and produces carriage sweep limit signals from the sweep limit bands A of the scale, respectively.

The microprocessor compares the desired carriage position, which it generates in response to its input 1 with the carriage position derived from encoder feedback while scanning the scale divisions, and then computes the required control for the motor. This is an incremental process and is repeated, in one embodiment of this invention, at 200 times per second. This computation of motor control voltage provides the basis for control of print carriage speed between the print limit bands B within which printing takes place.

The encoder which is shown, is a single channel incremental position encoder. This encoder functions as the feedback element in the control system. Its description here is believed to be sufficient for an understanding of this invention. This single channel encoder however, is the subject of a co-pending application of Mark W. Majette, et al, Ser. No. 07/056,936, filed 06-01-87, entitled Single Channel Encoder and assigned to the assignee of this invention. The subject matter of this single channel encoder application is included herein by reference.

The print carriage control system of FIG. 1 is the subject matter of a co-pending application of Mark W. Majette, et al, Ser. No. 07/077,575, filed 07-23-87, entitled Single Channel Encoder System and assigned to the assignee of this invention. The subject matter of this single channel encoder control system patent application is also included herein by reference.

In one practical embodiment of this invention, there are 90 scale divisions per inch on the encoder scale. The control circuit 4 doubles this to provide 180 pulse counts per inch required by the print heads for print drop firing. Control circuit 4 also quadruples the scale division pulse counts to provide 360 pulse counts per inch of scale required by the motor control.

When leaving the printing zone, the carriage is decelerated in the space between the print limit bands B and the sweep limit bands A. During printing, the carriage is stopped and reversed in the sweep limit bands A, and then accelerated to print speed between the sweep limit band A and the print limit band B. At the print limit band B, start-of-print is initiated resulting in the production of the print drop firing signals coupled by the bus 15 to the microprocessor.

A printhead assembly 20 comprising a printhead 21 and print drive circuit 22 is mounted on the print carriage and moves with the print carriage in the axis. The printhead 21 is of the thermal inkjet type. It may be a single color or a multi-color printhead. A nozzle array is provided for each color of ink in the printhead. Thermal excitation for each nozzle in each nozzle array is used to fire the ink drops. This thermal excitation in the form of voltage pulses is provided by the print drive circuit 22. Such arrangements are well known. The print drive circuits 22 conventionally comprise a printed circuit board to which the printhead is connected, forming the printhead assembly 20.

The microprocessor produces print data signals for controlling the firing of the printhead nozzles. The print data signals provide information for pulse formation, for nozzle firing, for printing text and/or graphics and for maintaining uniformity of ink drops by controlling printhead temperature. In accomplishing this, the print data output of the microprocessor is coupled via a bus 23 to a logic array circuit 24. The logic array circuit comprises a pulse generator and a pulse counter with provisions for pulse width control. The logic array circuit produces pulses coupled to the print drive circuits for selectively, and individually firing the nozzles of the print heads in a sequence to produce the text and/or graphics of the print data 1 as the printer carriage moves through the print zone between the print limit bands B on the scale.

Temperature compensation is provided in part by measuring the temperature of the printhead. This may be done by providing a nozzle substrate having temperature sensitivity, or by placing a temperature sensor TS on the nozzle substrate, or by locating a temperature sensor TS such as a thermistor on the carriage printed circuit board or on the printhead. Such temperature sensors are used to provide the input needed to estimate the printhead temperature, which, in turn, can be used to control the printhead temperature, using inexpensive electronics. As indicated in FIG. 1 the output of the temperature sensor TS is connected to the microprocessor 2. The print drive circuits are supplied with power by a power supply 26. The output of the temperature sensor TS is also coupled as a control input to the power supply 26 and is used to regulate print pulse energy inversely proportionally to printhead or nozzle temperature. Thus, temperature sensing at the printhead is used directly to control the power supply so that the pulse energy which is applied for firing the ink drops results in uniformity of the ink drops. In the microprocessor, the indication of printhead temperature is employed in a decision making process to determine the temperature condition of the nozzles, i.e., whether the nozzles are cold or whether the nozzles are overheating and is used with processor based information as to the location of the nozzles on the substrate, the color of the ink in a particular printhead and the use profile of that printhead, for providing input to the logic array circuit 24 for producing print pulses for firing the nozzles of that particular printhead, to maintain uniformity in the ink drops which are fired.

Figure 2A:
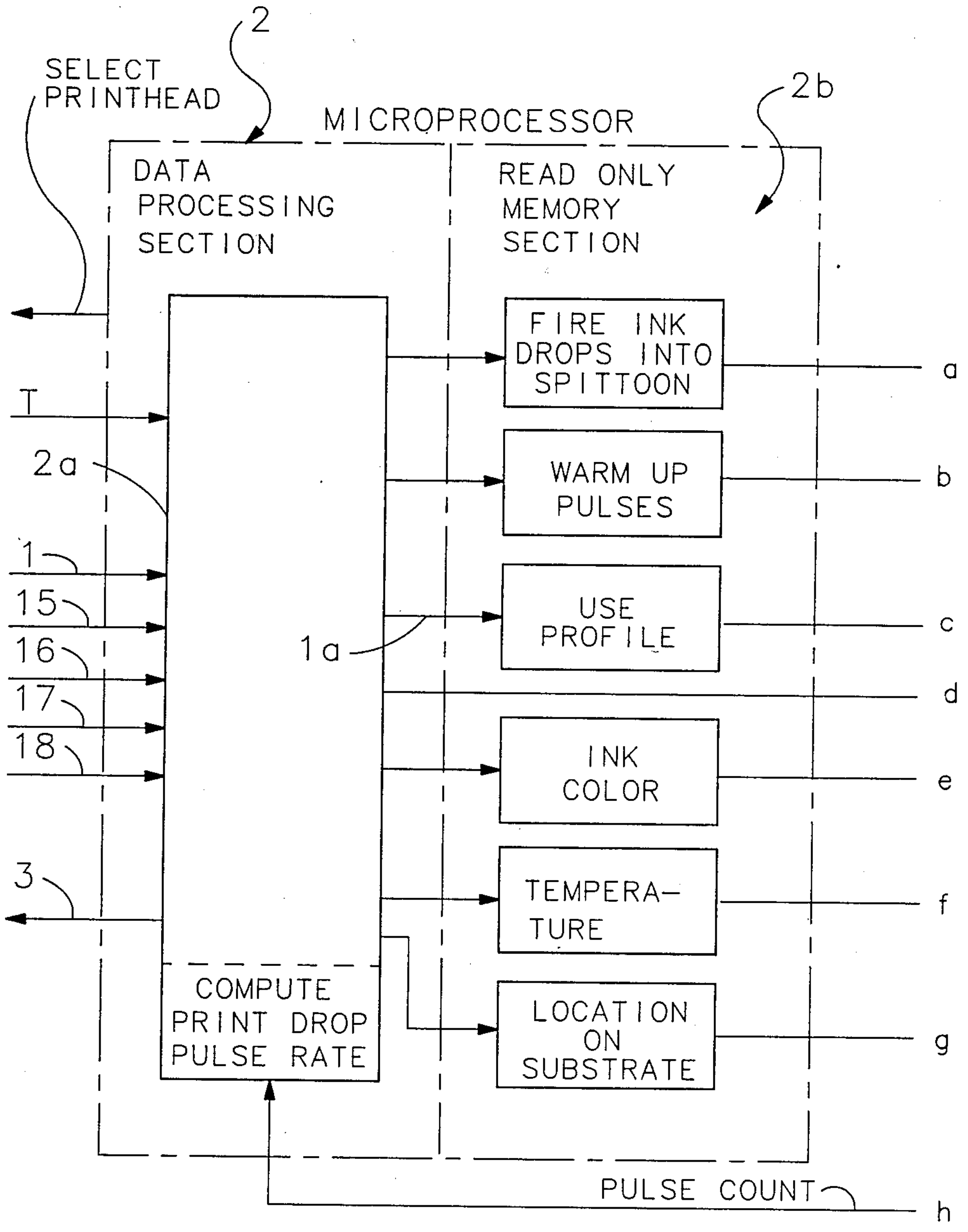
FIGS. 2A and B are block diagrams illustrating details of the printhead temperature control system of this invention.
Figure 2B:
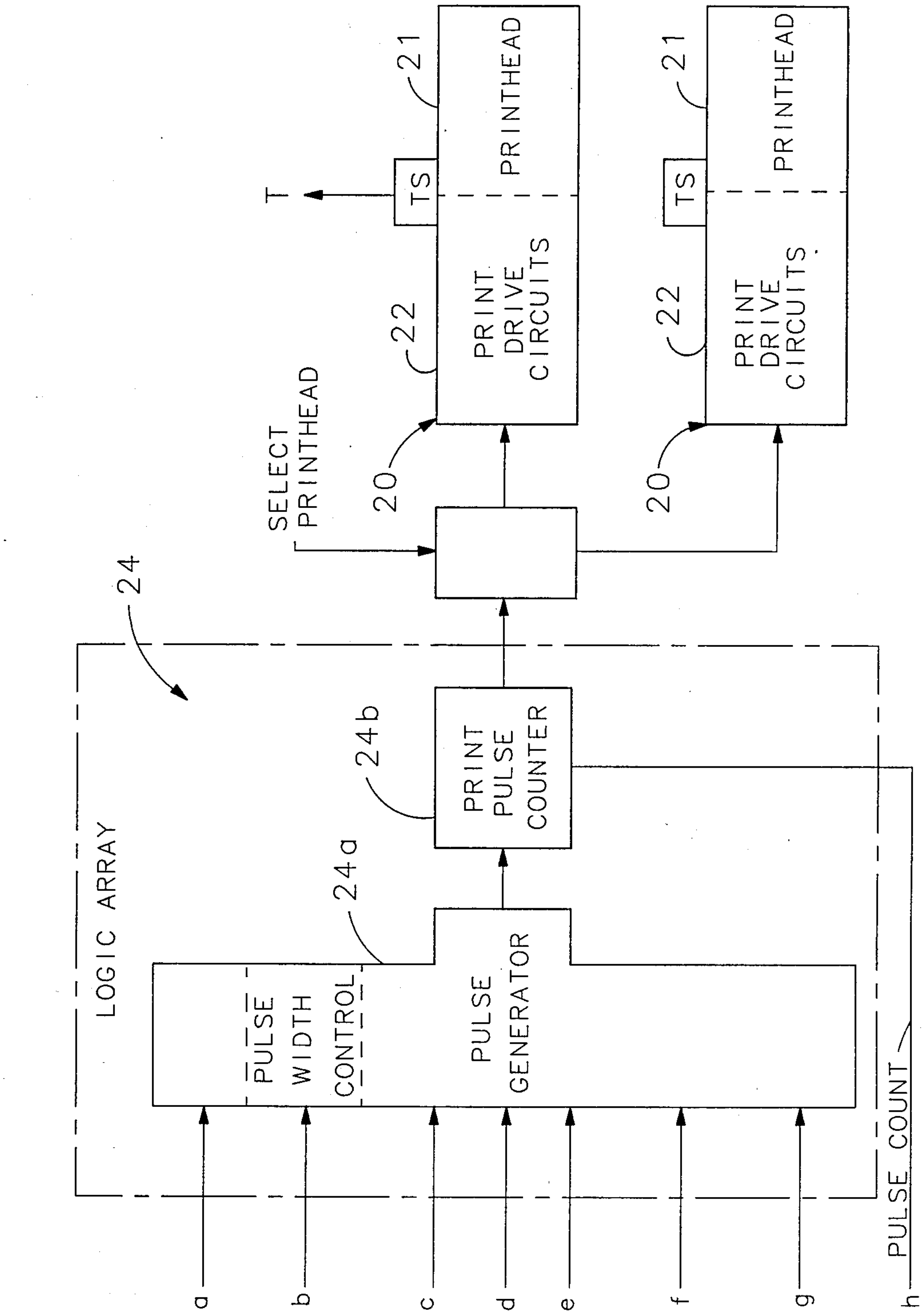

The organizational concept of that aspect of this temperature control system is illustrated in FIG. 2. In FIG. 2 the microprocessor 2 is shown in dot-dash outline. For the purpose of this description, it comprises a data processing section 2*a* and a read only memory section 2*b*. The data processing section uses the print data instructions on bus 1 to provide input by a bus 1*a* to a pulse generator 24*a* in the logic array circuit 24 for printing text. Print pulse timing in this respect is determined by the microprocessor using the print drop firing signals on the bus 15 at an input of the data processing section. Thus text is printed by the printhead 21 as the print carriage sweeps in its axis between the print limit bands B on the scale.

The output of the pulse generator 24*a* is coupled to the printhead drive circuits 22 through a print pulse counter 24*b* forming part of the logic array circuit 24. The pulse count output of the print pulse counter is coupled back to the data processing section 2*a* of the microprocessor where it is used to compute the print drop pulse rate of the printhead. This print drop pulse rate is used by the data processor in accessing use profiles in its read only memory section, for providing pulse generating input to the pulse generator so that, for example, in a multi-printhead printer another printhead may be selected for printing. In the alternative, for example, in a single printhead arrangement, excessive temperature alone or rising temperature with a high use profile may be processed by the data processing section of the microprocessor to produce a control to reduce data throughput to prevent the rise in temperature. This concept is tied in with the dwell time between the lines of print data. It is feasible because the printhead temperature time constant is long in comparison with the carriage sweep time in the axis. Thus the microprocessor produces motor control of a character to provide a predetermined dwell time of the carriage in either of the sweep limit bands A on the scale. These dwell intervals may take place at the end of each carriage sweep or at the end of selected carriage sweeps to control the printhead temperature as required.

Where multiple nozzle arrays are provided on a single substrate, the location of the nozzle array on the substrate has a bearing on its temperature. Similarly ink color is a factor in temperature control because some colors are more sensitive to low temperatures than others.

When the printhead is not in use, it resides in a park or rest position in a limit of carriage movement in which the carriage is removed entirely of the carriage print sweep range. This position is determined by a park band C on the scale, as seen in FIG. 1. When not in use, head temperatures may be below those which are acceptable for printing. The printhead assembly 21 is shown in park position in dot-dash outline in FIG. 1. Adjacent the printhead, in a position toward the adjacent sweep limit band A on the scale, is a spittoon 27, also shown in dot-dash outline. In this circumstance, when a print demand is made, the data processor section of the microprocessor may determine that a viscous plug exists in the printhead nozzle. Thus, when the command is issued for the carriage to move out of park position to perform a printing operation, the microprocessor provides an instruction to the pulse generator 24*a* to produce print drop firing pulses timed to expel print drops into the spittoon as the carriage moves out of the park position for a printing operation. This operation clears any plugs which may exist in the nozzles and additionally provides a degree of warm up depending upon the number of print pulses that have been applied in firing ink drops into the spittoon.

In other circumstances, if the printhead exists in a low temperature situation unacceptable for printing and the use profile is such that no viscous ink plugs exist in the nozzle, warm up pulses for the printhead may be selected. Warm up pulse instructions from the microprocessor, initiated by the data processing section accessing the warm up pulse data of the read only memory section, provides instructions to the pulse width control section of the pulse generator 24*a* to produce warm up pulses. These are time limited voltage bursts which heat but are too short to expel ink from the printhead.

Figure 3:
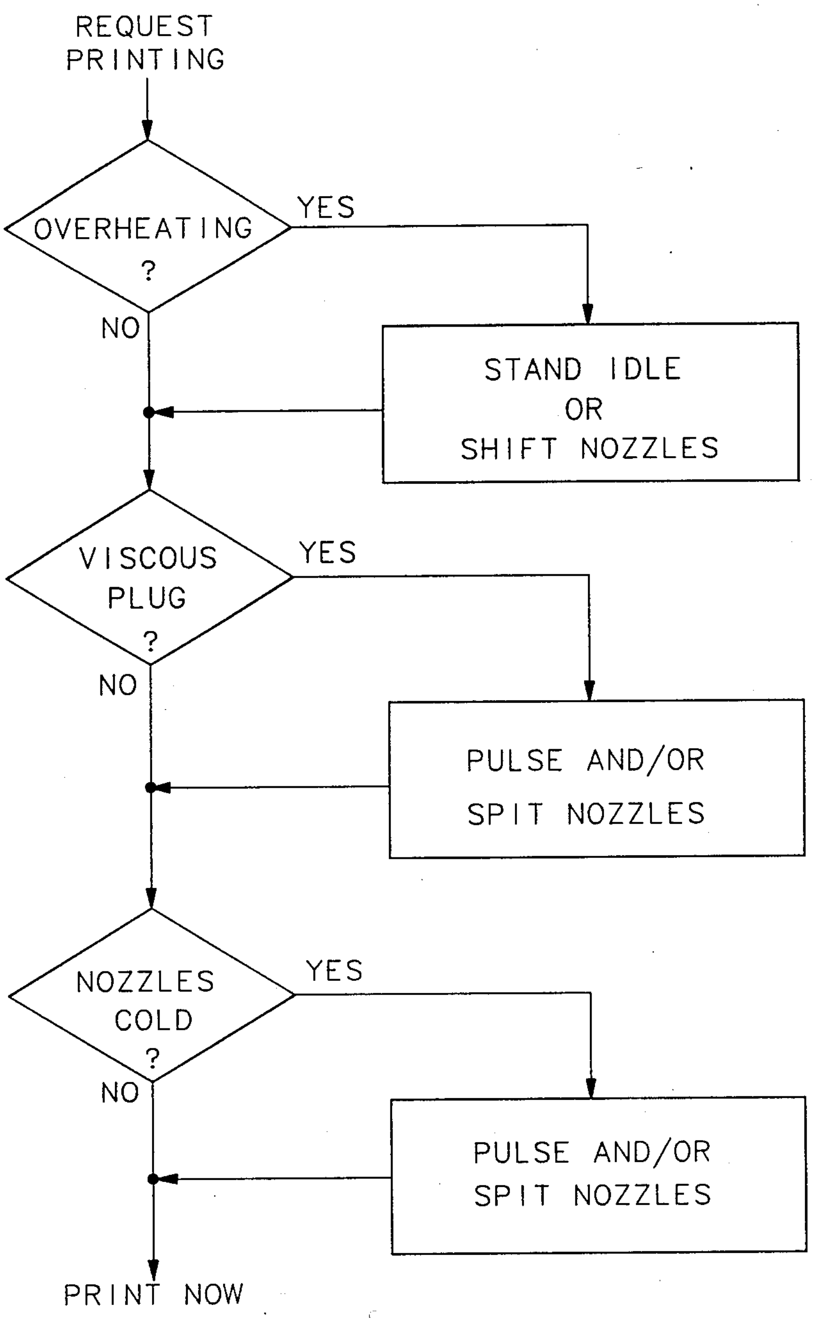
FIG. 3 is a flow chart illustrating the decision making process in the different functional modes of operation.

The flow chart of FIG. 3 characterizes these functions of the temperature control system. If there is overheating, the decision is to stand idle as in dwell time in the sweep limit bands A of the carriage, or in a multinozzle single color head assembly, to shift nozzles. In the event of a viscous plug, warming pulses and/or spitting of the nozzles may be employed. In the event the nozzles are cold, nozzle pulsing for warming and/or spitting may be employed. These decisions and actions always precede a following printing operation.

Industrial Applicability

The printhead temperature control for maintaining uniformity and quality of print or graphics is applicable in all thermal inkjet systems.

We claim:

1. A temperature control system for a thermal inkjet printer, having a printer carriage drive, a printer carriage movable by said printer carriage drive across a printing zone between sweep limit positions and movable to and from a rest position in response to print commands, and having a thermal inkjet printhead mounted on said carriage, comprising:

control means including said printer carriage drive and including print drive circuits coupled to said thermal inkjet printhead and responsive to the position of said printer carriage being driven by said printer carriage drive, for producing electrical pulses for firing inkdrops from said thermal inkjet printhead in said printing zone and for stopping said electrical pulses outside of said printing zone;

temperature sensor means for sensing the temperature of said thermal inkjet printhead; and means responsive to said temperature sensor means for controlling said printer carriage drive of said control means to reduce printer carriage speed above a predetermined sensed temperature, to permit said printhead to cool and thereby to maintain the temperature of said thermal inkjet printhead substantially at said predetermined temperature.

2. The invention according to claim 1, wherein said means responsive to said temperature sensor means comprises:

means for controlling said printer carriage drive of said control means to stop said printer carriage in a sweep limit position and to dwell therein to permit said thermal inkjet printhead to cool when the temperature thereof is above said predetermined temperature at that printer carriage position.

3. The invention according to claim 1, wherein said means responsive to said temperature sensor means comprises:

means responsive to a print command and to said temperature sensor means, as said printer carriage is moved from said rest position by said printer carriage drive of said control means, for causing said control means to apply electric pulses to said thermal inkjet printhead for firing ink drops before reaching a sweep limit position when the temperature of said thermal inkjet printhead as sensed by said temperature sensor means is below said predetermined temperature.

4. The invention according to claim 1, comprising:

means for counting said electrical pulses;

means for computing a pulse rate from said electrical pulses;

means for determining a quantity representing the intensity of use, i.e., the use profile of said thermal inkjet printhead from said pulse rate; and means responsive to said quantity for additionally controlling said control means to control pulse rate as an inverse function of the sensed temperature.

* * * * *